April 30, 1940.   G. W. WACKER   2,198,713
INJECTION MOLDING MACHINE
Filed Aug. 16, 1937
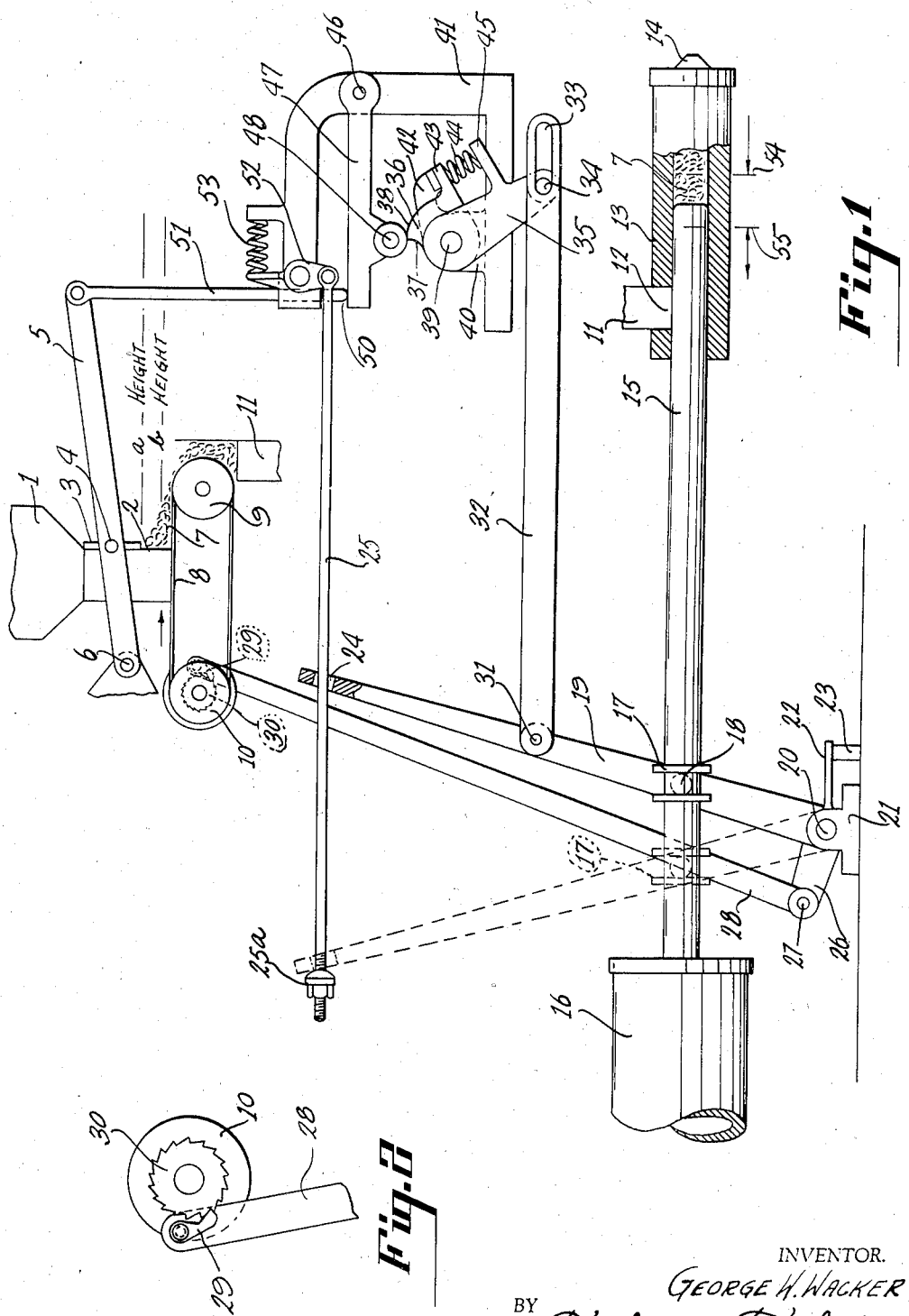
INVENTOR.
GEORGE W. WACKER
BY
ATTORNEY.

Patented Apr. 30, 1940

2,198,713

UNITED STATES PATENT OFFICE 2,198,713

INJECTION MOLDING MACHINE

George W. Wacker, Cincinnati, Ohio, assignor to The Grotelite Company, Bellevue, Ky., a corporation of Kentucky Application August 16, 1937, Serial No. 159,245

7 Claims. (Cl. 18—30)

My invention relates to plastic extrusion machines, and in particular to mechanism for regulating the amount of plastic material fed to the extrusion mechanism.

It is the object of this invention to provide mechanism so that granulated plastic material can be automatically fed into an injection chamber from which it is expelled into a mold. Prior to the expulsion, it is heated into a plastic condition.

The object of this invention is to insure an ample supply of material in the injection chamber to properly fill the mold at all times. The problem is complicated by the fact that the exact amount of material to fill the mold can not always be fed, because there are minute changes in the quantity of the material fed for each plunger stroke, due to variations in the bulk of the material.

The object of this invention is to remedy the troubles heretofor experienced in solving this problem. This solution of the present invention makes no effort to feed an exact and constantly varying charge. Its object, to the contrary, is to provide two different predetermined and unchanging rates of feed, one of which is an overfeed and the other an underfeed. The overfeed supplies more material than is necessary to fill the mold, and the underfeed supplies insufficient material to fill the mold on each plunger stroke. The amount of over or under feed is arbitrarily decided by the machine operator according to the conditions under which the machine is operated, but thereafter, this invention automatically selects the overfeed or underfeed to meet the operating conditions so established.

Referring to the drawing:

Figure 1 is a side elevation of the mechanism of this invention illustrated diagrammatically.

Figure 2 is a detailed view of the ratchet and pawl connection of the feed lever to one of the belt supports of the feed belt.

Referring to the drawing, 1 is a hopper for granular plastic material, having bottom opening 2, controlled by a slide 3, pivoted at 4 on a slide controlling lever 5, which is pivoted at 6. This slide 3 is adapted to assume two positions. Its upper position at the height a and its lower position at the height b. The material making its exit from the hopper 1 is indicated at 7. It is deposited upon a traveling belt 8 that is intermittently moved over its pulleys 9 and 10 for feeding the granulated material into a hopper 11. It discharges into the opening 12 of extrusion chamber 13 where the material 7 is being shown compressed, prior to injection into a mold through the nozzle 14. A plunger 15 brings about this injection. The plunger is suitably actuated through hydraulic fluid in the cylinder 16. This plunger carries a pair of spaced collars 17 between which operate the pin 18 of a plunger lever 19. This lever is pivoted at 20 on a block 21. It is provided with an extension 22 which engages the block 23 to limit its movement. The upper end of this lever is provided with an eye 24 through which passes the clamp release rod 25. There is connected to the lever 19 a crank arm 26, to which is pivoted at 27 a pitman, the upper end of which is provided with a pawl 29 engaging intermittently with the ratchet 30 associated with the pulley 10. Thus when the plunger 15 is retracted the belt is moved forwardly one step to feed the granular material to a predetermined amount.

Returning to the lever 19, there is pivoted to it at 31 the pitman 32 that has a slot end 33 for receiving the pin 34. This pin is mounted upon a cam carrying lever 35, which carries a selector cam 36, having the faces 37 and 38. The lever 35 is pivoted at 39 upon an ear 40 of the bracket 41. This bracket carries a stop 42 which is engaged by shoulder 43 of the lever 35. This shoulder is spring pressed by the spring 44 which is carried on the abutment 45 of the lever 35. The spring serves to hold the members 42 and 43 against one another until the cam 36, which is pivotally mounted on the lever 35 and upon the supporting shaft 39, is pressed backwardly as hereinafter described. There is also pivoted on this bracket 41 at 46 a lever 47 having a cam roller 48 engaging with the cam 36. The outer end of this lever 47 engages with the bottom 50 of the selector rod 51 which vertically reciprocates in the end of the bracket 41. This reciprocation is controlled and resisted by a cam carried on the locking member 52, which is spring pressed in one direction by the spring 53 and actuated in the other direction by the clamping release rod 25 when that rod is engaged by the lever 19 engaging with the nut 25a on the rod 25.

Operation

Assuming the operator has set the machine for a predetermined feed, that is, a predetermined amount of over or under feed, then the automatic selector mechanism operates as follows: the plunger 15 moves into empty injection chamber 13. As it meets with no resistance, it travels to the full extent of its stroke. In so doing, it has rotated the selector cam 36 to the limit of its possible movement being translated to it from the lever 19 by the connecting rod or pitman 32. As the selector cam 36 is made up of the spring loaded cam proper 36 and the lever 35, when the cam is rotated sufficiently, the step of the cam comes into contact and engages the roller as shown in Figure 1. This act meets with a certain resistance, partly caused by the frictional lock 52 engaging the selector rod 51. The continued movement of the lever is possible with the cam 36 remaining stationary, until the accumulated pressure of the cam spring 44 overcomes the pressure of the roller, and the roller 48 with the selector rod 51 is forced upward. The object of the spring load cam is to positively provide for only two definite operative positions for the cam rod, so that it will not be possible for the cam roller 48 to dwell part way up the incline of the cam leading to the step. This upward motion imparted to the rod 51 by the cam 36 is transferred through the lever 5 to the slide 3 so as to place the slide at its upper position. The selector rod 51 holds this position due to the action of the frictional lock 52 provided for this purpose. The plunger now starts on the return movement, rotating the selector cam 36 so that the roller 48 now rides on the lower step of the cam. The cam rod 51 remains in its upper position temporarily. The return movement of the plunger 15 has operated the belt feed 8, as heretofore described, through the lever 26, 28, pawl 29, and the ratchet 30. It delivers a definite overcharge of material into the injection chamber 13. Just before the plunger 15 completes the return stroke, the frictional clamp 52 holding the cam rod is released by the release rod 25. The slide 3 then assumes its lower or underfeed position. This sequence of operations is then repeated. The injection of material into the mold will begin when enough material has been accumulated in the heating chamber 11 of the injection cylinder 13. After a number of strokes of the plunger 15, the surplus material accumulating in the injection chamber will have reached the point where further accumulation is undesirable. This is indicated at the lower right hand of Figure 1. The arrow pointing to the mark 54 indicates the overfeed position, and the mark at the arrow pointing to the line 55 indicates the underfeed position. When the surplus material has accumulated, due to overfeed to an undesirable amount, the travel of the plunger 15 on the forward stroke is lessened due to stalling on the accumulation. In this event the rotated movement of the selector cam 36 is no longer sufficient to compress the cam spring 44 to the point where it can overcome the pressure of the selector rod 51. As a result of this, the rod is no longer moved upwardly, but remains in the lower selective position. In this way the lower or underfeed position has been automatically selected. The feed now delivers a restricted amount of material, that is, an undercharge, to the injection chamber 13, and each succeeding stroke of the plunger 15 now forces out more material than is fed in. The result is that the plunger 15 moves into the chamber 13 further and further until the selector cam 36 is again tripped and the over charging cycle begins again. There are therefore two cycles of operation of this mechanism: the overfeed cycle and the underfeed cycle. The transition from one cycle to the other and the selective operation of the mechanism as a result thereof, depend upon the result of overfeeding or underfeeding so that there is always more material than necessary to fill a mold, and when the lower limit of what is a safe excess to have in the injection chamber 13 has been reached, then the cycle of overfeeding begins.

It will be understood that I desire to comprehend within this invention such modifications as may be necessary to adapt it to varying conditions and uses.

Having thus fully described my invention, what I claim as new and desire to secure by Letters Patent, is:

1. In combination, a material container, an injection chamber, an injector movable in said chamber, a feeder for feeding material from said container to said injection chamber, means for operating said feeder, a feed regulator for controlling delivery of material from said container in one position at a predetermined substantially constant underfeed rate and in another position at a predetermined substantially constant overfeed rate, means responsive to the travel of said injector beyond a predetermined length of stroke for shifting said feed regulator from its underfeed position to its overfeed position, and means for shifting said feed regulator back to its underfeed position.

2. In combination, a material container, an injection chamber, an injector movable in said chamber, a feeder for feeding material from said container to said injection chamber, means for operating said feeder, a fed regulator for controlling delivery of material from said container in one position at a predetermined substantially constant underfeed rate and in another position at a predetermined substantially constant overfeed rate, means responsive to the travel of said injector beyond a predetermined length of stroke for shifting said feed regulator from its underfeed position to its overfeed position, and means responsive to the retraction of said injector for shifting said feed regulator back to its underfeed position.

3. In combination, a material container, an injection chamber, an injector movable in said chamber, a feeder for feeding material from said container to said injection chamber, means operatively connected to said injector and responsive to the motion thereof for operating said feeder, a feed regulator for controlling delivery of material from said container in one position at a predetermined substantially constant underfeed rate and in another position at a predetermined substantially constant overfeed rate, means responsive to the travel of said injector beyond a predetermined length of stroke for shifting said feed regulator from its underfeed position to its overfeed position, and means for shifting said feed regulator back to its underfeed position.

4. In combination, a material container, an injection chamber, an injector movable in said chamber, a feeder for feeding material from said container to said injection chamber, means for operating said feeder, a feed regulator for controlling delivery of material from said container in one position at a predetermined substantially constant underfeed rate and in another position at a predetermined substantially constant overfeed rate, means including a cam and mechanism operated thereby responsive to the travel of said injector beyond a predetermined length of stroke for shifting said feed regulator from its underfeed position to its overfeed position, and means for shifting said feed regulator back to its underfeed position.

5. In combination, a material container, an injection chamber, an injector movable in said chamber, a feeder for feeding material from said container to said injection chamber, means for operating said feeder, a feed regulator for controlling delivery of material from said container in one position at a predetermined substantially constant underfeed rate and in another position at a predetermined substantially constant overfeed rate, means responsive to the travel of said injector beyond a predetermined length of stroke for shifting said feed regulator from its underfeed position to its overfeed position, means for releasably holding said feed regulator in its overfeed position, and means for releasing said holding means to shift said feed regulator back to its underfeed position.

6. In combination, a material container, an injection chamber, an injector movable in said chamber, a feeder for feeding material from said container to said injection chamber, means for operating said feeder, a feed regulator for controlling delivery of material from said container in one position at a predetermined substantially constant underfeed rate and in another position at a predetermined substantially constant overfeed rate, mechanism including a cam, a cam follower operatively connected to said feed regulator, a cam actuator operatively connected to said injector, and a yielding element between said cam and said cam actuator, said mechanism being responsive to the travel of said injector beyond a predetermined length of stroke for shifting said feed regulator from its underfeed position to its overfeed position, and means for shifting said feed regulator back to its underfeed position.

7. In combination, a material container, an injection chamber, an injector movable in said chamber, a feeder for feeding material from said container to said injection chamber, means for operating said feeder, a feed regulator for controlling delivery of material from said container in one position at a predetermined substantially constant underfeed rate and in another position at a predetermined substantially constant overfeed rate, mechanism including a cam, a cam follower operatively connected to said feed regulator, a cam actuator operatively connected to said injector, and a yielding element between said cam and said cam actuator, said mechanism being responsive to the travel of said injector beyond a predetermined length of stroke for shifting said feed regulator from its underfeed position to its overfeed position, means for releasably holding said feed regulator in its overfeed position, and means for releasing said holding means to shift said feed regulator back to its underfeed position.

GEORGE W. WACKER.